US010187908B2

(12) United States Patent
Gärdenfors (10) Patent No.: US 10,187,908 B2
(45) Date of Patent: Jan. 22, 2019

(54) SYSTEM AND METHOD FOR INDICATING PAIRING AVAILABILITY BETWEEN DEVICES

(71) Applicant: BlackBerry Limited, Waterloo (CA)

(72) Inventor: Dan Zacharias Gärdenfors, Malmö (SE)

(73) Assignee: BlackBerry Limited, Waterloo (CA)

( * ) Notice: Subject to any disclaimer, the term of this patent is extended or adjusted under 35 U.S.C. 154(b) by 655 days.

(21) Appl. No.: 14/273,869

(22) Filed: May 9, 2014

(65) Prior Publication Data

US 2015/0327309 A1    Nov. 12, 2015

(51) Int. Cl.
*G06F 15/16* (2006.01)
*H04W 76/02* (2009.01)
(Continued)

(52) U.S. Cl.
CPC ............ *H04W 76/023* (2013.01); *G08B 5/36* (2013.01); *H04W 4/80* (2018.02); *H04W 8/005* (2013.01);
(Continued)

(58) Field of Classification Search
CPC ........ H04H 20/08; H04H 20/18; H04H 20/38; H04H 20/57; H04H 20/61; H04H 20/63; H04H 60/80; H04H 60/88; H04W 4/02; H04W 12/08; H04W 4/008; H04W 76/023; H04W 68/00; H04W 8/005; H04W 4/005; H04W 4/023; H04W 4/026; H04W 4/12;
(Continued)

(56) References Cited

U.S. PATENT DOCUMENTS 7,711,861 B2    5/2010  Yuval
7,907,901 B1*   3/2011  Kahn .................. H04M 1/7253
                                                         455/41.1
(Continued)

FOREIGN PATENT DOCUMENTS

EP         2475182 A2    7/2012
WO    WO 2013/083868 A1  6/2013

OTHER PUBLICATIONS

Killian Bell, "Use Bump to Instantly Share Contacts & Photos With Your Friends [iOS Tip]" , Feb. 24, 2012, pp. 2-3 (Year: 2012).*
Mayrhofer R. et al: "Shake well before use: intuitive and secure pairing of mobile devices". IEEE Transactions on Mobile Computing, IEEEE Service Center, Los Alamitos, CA, US, vol. 8, No. 6, Jun. 1, 2009, p. 792-806.
(Continued)

*Primary Examiner* — Joseph E Avellino
*Assistant Examiner* — Rachel J Hackenberg
(74) *Attorney, Agent, or Firm* — Ridout and Maybee LLP (57) ABSTRACT

A system and method are provided including an electronic device having a processor, a display coupled to the processor, a memory coupled to the processor, a short-range communication system coupled to the processor, a transducer coupled to the processor, and a communication module saved in the memory. The communication module configures the processor to execute a communication discovery process, the communication discovery process including sending information via the short range communication system to a pairable device, the information including data for executing a coordinated indication of pairability; receive an affirmative response via the short-range communication system from the pairable device; and perform the coordinated indication of pairability.

20 Claims, 4 Drawing Sheets

(51) Int. Cl.
*G08B 5/36* (2006.01)
*H04W 68/00* (2009.01)
*H04W 12/08* (2009.01)
*H04W 8/00* (2009.01)
*H04W 4/80* (2018.01)
*H04W 76/14* (2018.01)
*G08C 23/04* (2006.01)
*G08C 17/02* (2006.01)

(52) U.S. Cl.
CPC ........... *H04W 12/08* (2013.01); *H04W 68/00* (2013.01); *H04W 76/14* (2018.02); *G08C 17/02* (2013.01); *G08C 23/04* (2013.01); *G08C 2201/20* (2013.01)

(58) Field of Classification Search
CPC ......... H04W 52/0229; H04W 56/0015; H04W 56/0025; H04W 88/02; H04M 1/7253; G08C 17/02; G08C 2201/20; G08C 23/04
See application file for complete search history.

(56) References Cited

U.S. PATENT DOCUMENTS

| | | | |
|---|---|---|---|
| 2009/0286479 A1 | 11/2009 | Thoresson et al. | |
| 2010/0278345 A1* | 11/2010 | Alsina | H04W 12/06 380/283 |
| 2011/0063103 A1 | 3/2011 | Lee et al. | |
| 2011/0169654 A1 | 7/2011 | Ketari | |
| 2012/0088524 A1* | 4/2012 | Moldavsky | G06Q 30/02 455/456.3 |
| 2014/0273854 A1* | 9/2014 | Breckman | H04W 76/021 455/41.2 |
| 2015/0050879 A1* | 2/2015 | MacDuff | H04W 12/06 455/39 |
| 2015/0319506 A1* | 11/2015 | Kansara | H04N 21/4307 725/32 |
| 2016/0125733 A1* | 5/2016 | Sallas | G08C 23/04 398/106 |

OTHER PUBLICATIONS

Extended European Search Report; EP 15165360.7; dated Sep. 28, 2015.

* cited by examiner

SYSTEM AND METHOD FOR INDICATING PAIRING AVAILABILITY BETWEEN DEVICES

FIELD

The present application is generally related to communication between electronic devices, and more particularly to a system and method for indicating pairing availability between electronic devices.

BACKGROUND

Communication devices such as mobile communication devices increasingly communicate with other electronic devices, such as headsets, automobiles, televisions, etc., via a host of communications standards. Pairing or connecting a mobile communication device with another electronic device can be a cumbersome process, typically requiring the user to navigate to a special screen in the user interface of the mobile communication device and search for other electronic devices that are available for pairing. Consequently, it would be desirable to have an improved system and method for discovering other pairable devices that may be paired with the mobile communications device.

BRIEF DESCRIPTION OF DRAWINGS

In order that the subject matter may be readily understood, embodiments are illustrated by way of examples in the accompanying drawings, in which.

DETAILED DESCRIPTION

In accordance with an aspect of the present description, described is an electronic device comprising a processor, a display coupled to the processor; a memory coupled to the processor, a short-range communication system coupled to the processor, a transducer coupled to the processor, and a communication module saved in the memory. The communication module configures the processor to initiate a communication discovery process, receive an affirmative response via the short-range communication system from a pairable device, and perform a coordinated indication of pairability. The communication discovery process includes sending information via the short range communication system to the pairable device, the information including data for executing the coordinated indication of pairability.

In accordance with another aspect of the present description, described is a method on an electronic device of providing a coordinated indication of pairability between the electronic device and a pairable device. The electronic device has a processor coupled to a display, a memory, a short-range communication system, and a transducer. The method comprises initiating a communication discovery process, receiving an affirmative response via the short-range communication system from the pairable device and performing a coordinated indication of pairability. The communication discovery process includes sending information via the short range communication system to the pairable device, the information including data for executing the coordinated indication of pairability.

In accordance with another aspect of the present description, described is a non-transitory computer-readable medium storing program instructions that when executed by a processor, cause the processor to perform a method for providing a coordinated indication of pairability between an electronic device and a pairable device. The method comprises initiating a communication discovery process, receiving an affirmative response via the short-range communication system from a pairable device and performing the coordinated indication of pairability. The communication discovery process includes sending information via the short range communication system to the pairable device, the information including data for executing a coordinated indication of pairability.

A common problem is the cumbersome nature of pairing a mobile electronic device (hereinafter referred to simply as an "electronic device") with other devices, for example for communication via Bluetooth®, WiFi, or Near Field Communications (NFC). Typically the user has to navigate to a special screen in the user interface of the electronic device and search for other electronic devices (such as headsets, automobiles, tablet computers, or televisions) that are available for pairing and then perform a search to see what devices in the vicinity are available for pairing.

Additionally, in environments with many devices and many people carrying personal devices, it can be difficult for people to know what devices they can access. Imagine, for example a parking lot where many people are trying to find their cars all at once. If they "call on their cars" from their mobile devices and the cars reply through sounds or flashing headlights, it becomes easier to find one's own car if the car communicates through a pattern that is synchronized with a pattern on the device used to call on it.

To address one or more of the above-noted issues an indicator, such as a light emitting diode (LED) of the electronic device, may flash and an LED of an available pairable electronic device may also flash. The flashing of the LEDs of the electronic device and the available pairable electronic device may occur such that there is a relationship between the flashing of the LEDS of the two devices, making it clear to an observer that the devices may be paired for information exchange without a user having to navigate to a special screen in the graphical user interface (GUI) of the electronic device and initiate a search function to discover such pairability.

Example Communication Device

Figures 1, 2:
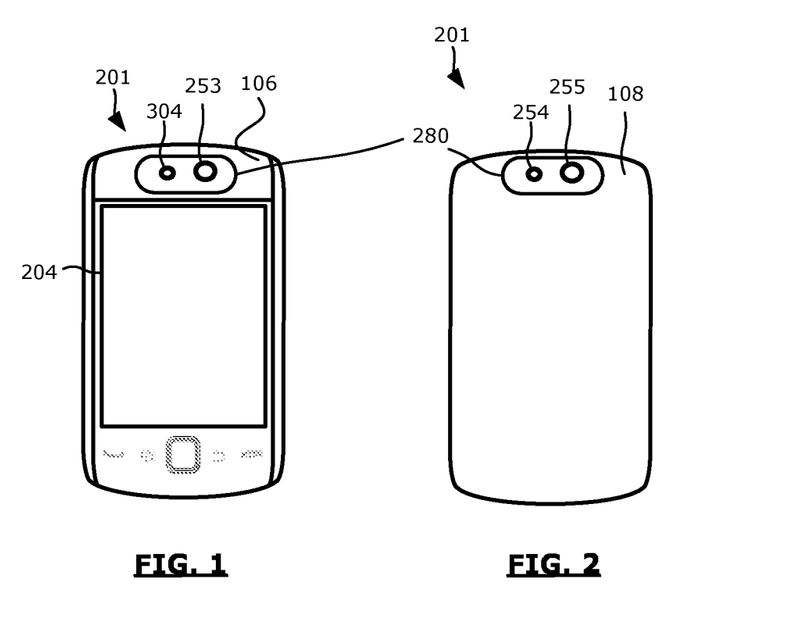
FIG. 1 is a front elevation view of an example electronic device in accordance with aspects of the present disclosure.
FIG. 2 is a rear elevation view of the example electronic device of FIG. 1 in accordance with aspects of the present disclosure.

Referring first to FIG. 1, a front view of an example electronic device 201 is illustrated. The electronic device can be a mobile phone, portable computer, smartphone, tablet computer, personal digital assistant, a wearable computer such as a watch, a television, a digital camera or a computer system, for example. The electronic device may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 that includes a main display 204 of the electronic device 201. The front face 106 of the electronic device 201 is a side of the electronic device 201 that is configured to be viewed by a user. The front face 106 also includes a front facing camera 253 and a transducer 304. In one example, the transducer 304 may be an electromagnetic transducer. In one example, the transducer 304 may be a light emitting device. In one example, the transducer 304 may an electromagnetic transducer such as a light emitting diode (LED). However, the transducer 304 may be any suitable transducer to meet the design criteria of a particular application. In other examples, the transducer 304 may be a speaker, similar to the speaker 256, or a transducer that generates vibrations, such as a vibrator.

FIG. 2 illustrates a rear view of the electronic device 201. The rear view of the electronic device 201 illustrates a rear face 108 of the electronic device 201. The rear face 108 is a side of the electronic device 201 that does not include a main display 204 of the electronic device 201. In the example illustrated, the rear face 108 is a side of the electronic device 201 that is opposite the front face 106 (FIG. 1) of the electronic device 201. That is, the rear face 108 may be substantially parallel to the front face 106 of the electronic device 201. The rear face 108 also includes a rear facing camera 254, and optionally a flash 255.

The electronic device 201 includes one or more cameras 253, 254. The cameras 253, 254 are configured to generate camera media, such as images in the form of still photographs, motion video or another type of camera data. The camera media may be captured in the form of an electronic signal which is produced by an image sensor associated with the cameras 253, 254. Components other than the image sensor may be associated with the cameras 253, 254, although such other components may not be shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera media or camera data) from which information referred to as image context may be computed.

In the example illustrated, the electronic device 201 includes a rear facing camera 254. A rear facing camera is a camera 254 that is located to obtain images of a subject near a rear face 108 of the electronic device 201. That is, the rear facing camera may be located on or near a rear face 108 of the electronic device 201.

The electronic device 201 also includes a front facing camera 253 instead of or in addition to the rear facing camera 254. The front facing camera 253 is a camera which is located to obtain images of a subject near the front face 106 of the electronic device 201. That is, the front facing camera may be generally located at or near a front face 106 of the electronic device 201.

The electronic device 201 includes one or more flashes 255. The flash 255 may, in at least some examples, be a light emitting diode (LED) flash. The flash 255 emits electromagnetic radiation. More particularly, the flash 255 may be used to produce a brief bright light which may facilitate picture-taking in low light conditions, or provide light emission for other purposes.

Still referring to FIG. 2, transparent covers 280 cover the image sensors of the cameras 253, 254, the flash 255, and the transducer 304. The transparent cover 280 allows light to pass through (e.g. from the flash 255 or the transducer 304, in the example of a light emitting transducer 304, to the exterior of the housing or from the exterior of the housing to the image sensor) and prevents debris or dirt from entering into the housing. In the example illustrated in FIG. 2 transparent covers 280 are secured to the housing. For example, the transparent covers 280 may be secured to the housing using an adhesive or using snaps or similar attachment mechanism in such a manner so as to be flush with the housing. The transparent covers 280 can be transparent and made out of glass or plastic or another suitable transparent or translucent material. For example, the cover 280 can be made out of stained or partially stained glass.

Figure 3:
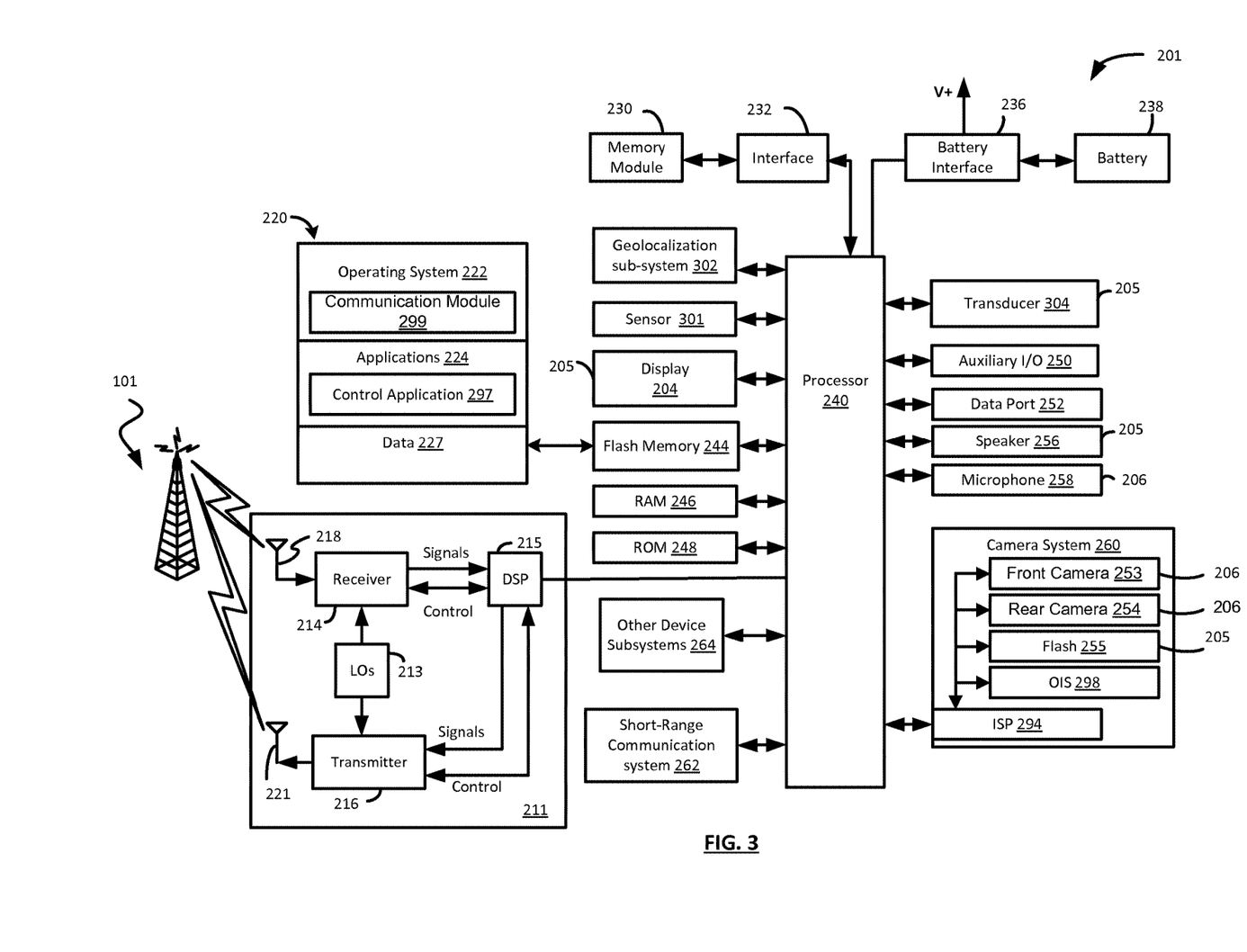
FIG. 3 is a block diagram illustrating components of the example electronic device of FIG. 1 in accordance with aspects of the present disclosure.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with components or device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, 254, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, the transducer 304, one or more speakers 256, or other output interfaces), a short range communication system 262, and other device subsystems generally designated as 264. Some of the components or subsystems shown in FIG. 3 perform communication-related functions, whereas other components or subsystems may provide "resident" or on-device functions.

The electronic device 201 may include a touchscreen display. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some examples, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various examples, the data 227 may include service data having information used by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data. The data 227 may, in at least some examples, include metadata which may store information about the images. In some embodiments the metadata and the images may be stored together. That is, a single file may include both an image and also metadata regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some examples, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing. Further, data may be transmitted to and from the electronic device 201 using a WiFi network or using near field communication technologies.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication system 262 provides for communication between the electronic device 201 and different systems or devices, which need not necessarily be similar devices. For example, the short range communication system 262 may include an infrared device and associated circuits and components, a wireless bus protocol compliant communication mechanism such as a Bluetooth® communication module, or a Near Field Communications (NFC) system to provide for communication with similarly-enabled systems and devices.

The electronic device 201 can also include one or more sensors 301 such as temperature sensor, rotation sensors (for example, a gyroscope), translation sensors (for example accelerometers), position sensors (for example, magnetometers), and sensor sub-systems such as a geolocalization sub-system 302, which can be based on a global positional signal.

In the example illustrated, the cameras 253, 254 are included in a camera system 260 along with a flash 255, an optical image stabilizer (OIS) 298 and an image signal processor (ISP) 294. The optical image stabilizer (OIS) 298 may be integrated with the cameras 253, 254 or it may be a separate component. For example, the OIS 298 may be considered as a functional part of the camera system 260. Similarly, the ISP 294 may be embedded in the processor 240 and it may also be considered as a functional part of the camera system 260. In at least some examples, the cameras 253, 254 may be associated with a dedicated image signal processor 294 which may provide at least some camera-related functions, with the image signal processor 294 being either embedded in the cameras 253, 254 or a separate device. For example, in at least some embodiments, the image signal processor 294 may be configured to provide auto-focusing functions.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication system 262, or other suitable device subsystems 264. The downloaded programs or code modules may be permanently installed; for example, written into the program memory (e.g. the flash memory 244), or written into and executed from the RAM 246 for execution by the processor 240 at runtime.

The electronic device may have a communication module 299, which may be implemented as part of the operating system 222. Alternatively, the communication module 299 may be installed as one of the applications 224. The communication module 299 may implement many or all of the communication features of the electronic device 201, such as connection discovery, pairing, communications session initiation, data exchange, encryption, etc. The communication module 299 may operate in communication with other applications or modules, such as the control application 297, for exchanging data with another electronic device that may be paired with the electronic device 201 for data exchange.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include the operating system software 222 and one or more additional applications 224 or modules such as, for example, the control application 297. The processor 240 may also operate to process data 227 stored in memory associated with the electronic device 201.

In the example of FIG. 3, the control application 297 is illustrated as being implemented as a stand-alone application 224. However, in other example examples, the control application 297 could be provided by another application or module such as, for example, the operating system software 222 or, in some examples, the communication module 299. Further, while the control application 297 is illustrated with a single block, the functions or features provided by the control application 297 could, in at least some embodiments, be divided up and implemented by a plurality of applications and/or modules. The control application 297 may provide a number of functions. For example, the control application 297 could be an application that is designed to interface with another electronic device such as a tablet computer. In another example, the control application 297 could be designed to interface with a television and provide remote control capabilities for the television, data streaming for viewing on the television, or even provide a personal video recorder (PVR) function to the television.

The software modules 220 or parts thereof may be temporarily loaded into volatile memory such as RAM 246. The RAM 246 is used for storing runtime data variables and other types of data or information. Although specific functions are described for various types of memory, this is merely one example, and a different assignment of functions to types of memory Example Methods of Indicating Pairing Availability on an Electronic Device Referring to FIG. 4, a flow chart is shown illustrating an exemplary method 400 of indicating pairing availability as executed on an electronic device. In one example, the method 400 can be implemented on an electronic device 201 having a processor 240, a display 204 coupled to the processor 240, a memory (244 and/or 246 and/or 248) coupled to the processor 240, a short-range communication system 262 coupled to the processor, and a transducer 304 coupled to the processor 240. In one example, a software module such as the communication module 299 or the control application 297 saved in the memory may configure the processor 240 to perform the method 400.

Figure 4:
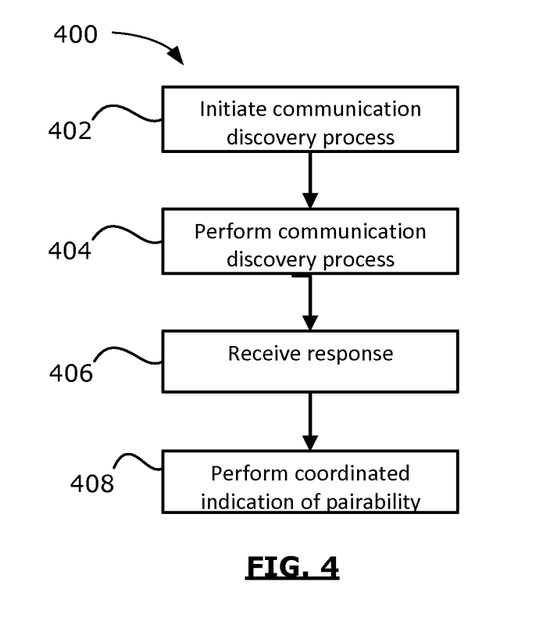
FIG. 4 is a flow chart illustrating an example of a method of indicating pairing availability as executed on the electronic device of FIG. 1.

At a first block 402, a communication discovery process may be initiated, for example by the electronic device 201. In one example, the communication discovery process may be automatically initiated by the communication module 299 in response to an expiry of a timer, input from any of the input devices 206, input from the sensor 301 indicating usage or a state of usage of the electronic device 201, or any other suitable input. In another example, the communication discovery process may be initiated in response to an input provided by the user of the electronic device 201, for example using the touch sensitive display 204 when the user decides that the user wishes to search for pairable devices using the electronic device 201.

Next, at a block 404, the communications discovery process may be performed. The communication discovery process may include sending information via the short range communication system 262 to pairable devices as an inquiry to see if such pairable devices are configured to accept a pairing. In one example, the information sent to the pairable devices may include data for executing a coordinated indication of pairability. Pairable devices may refer to other electronic devices in the vicinity of the electronic device 201 that may communicate with the electronic device 201 using a short-range communication system, such as Bluetooth®, Radio Frequency ID (RFID), Near Field Communications (NFC), WiFi, Infrared light based communication, electric field (e-field) sensor based communication, or any other suitable existing or yet to be developed short-range communications system that may be adapted to work with the method 400. Such pairable devices may include tablet computers, laptop computers, desktop computers, wireless headsets for making phone calls or listening to audio, televisions, displays, cameras, bluray players, DVD players, other media players, wearable devices, internet connected devices, smart home appliances such as washing machines or refrigerators, climate control systems, home alarms, automobile alarms, telephones, automobile media systems, ecommerce systems, remote control indoor or outdoor lights, or any other suitable electronic device that could be paired with the electronic device 201 using a suitable short-range communication system. The process of pairing or negotiating communications links using standards such as Bluetooth®, Near Field Communications (NFC), or WiFi, is known to those of skill in the relevant arts and will not be discussed in detail herein.

Figure 6:
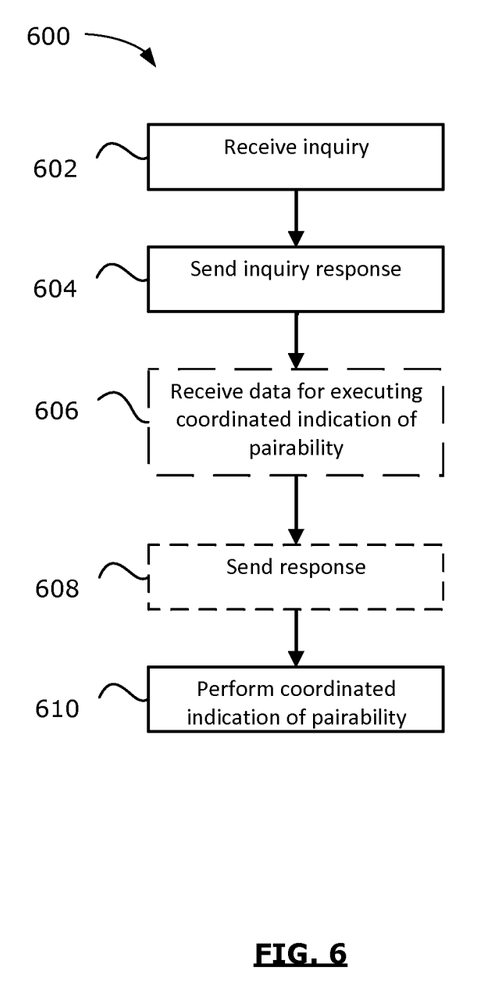
FIG. 6 is a flow chart illustrating an example of a method of indicating pairing availability as executed on a second pairable electronic device that may be pairable with the electronic device FIG. 1.

Referring to FIG. 6, a flow chart is shown illustrating an example of a method 600 of indicating pairing availability as executed on a second pairable electronic device that may be pairable with the electronic device 201. FIG. 6 will be discussed in parallel with FIG. 4 since information exchange between the electronic device 201 (as shown in FIG. 4) and a pairable device (as shown in FIG. 6) happens concurrently. In other words, as the method 400 is executed on the electronic device 201, the method 600 may also be executed at the same time on a pairable device. Suitable pairable devices such as those discussed above may have an architecture similar to that of the electronic device 201 shown in respect of FIG. 3 and may include many or all of the components shown in FIG. 3. Suitable pairable devices may have a processor coupled to a memory with a component saved in the memory that executes the method 600. Suitable pairable devices may also have a display coupled to the processor and a transducer, such as the transducer 304, coupled to the processor.

At a block 602, a pairable device in the vicinity of the electronic device 201 may receive a pairing inquiry when the electronic device 201 performs block 404. In one example, when the electronic device 201 executes block 404, a pairing inquiry may be sent out to pairable devices in the vicinity of the electronic device 201. In one example, the pairing inquiry may include information including data for executing a coordinated indication of pairability. A pairable device may receive this inquiry at block 602, including the information that includes data for executing a coordinated indication of pairability.

At a block 604, the pairable device may respond with an inquiry response to be received by the electronic device 201 at a block 406 (FIG. 4). If the pairable device is capable of pairing and if the pairable device is capable of presenting a coordinated indication of pairability as requested by the electronic device 201 at the block 404, the pairable device may respond with an affirmative inquiry response at the block 604. In one example, the information that includes data for executing a coordinated indication of pairability may include: (a) the type of coordinated indication requested; and (b) clock synchronization information. If the pairable device is capable of pairing and if the pairable device is capable of presenting a coordinated indication of pairability as requested by the electronic device 201 at the block 404, the pairable device may respond with an affirmative inquiry response.

If an affirmative inquiry response is received by the electronic device 201 at the block 406, the coordinated indication of pairability is performed at the block 408 by the electronic device 201 and by the pairable device at the block 610. Blocks 606 and 608 of method 600 are optional and are described below in connection with FIG. 5.

The coordinated indication of pairability may include a number of possible indications that the electronic device 201 is pairable with a pairable device. In one example, pairability of the electronic device 201 may be indicated by emitting an electromagnetic signal using the transducer 304. In one example, the transducer 304 may be an electromagnetic transducer and the emission may have a pattern that corresponds to an indication presented by the pairable device based on the data. For example, the electromagnetic transducer may include a light emitting diode (LED) and the emission may be achieved by emitting light using the LED. In one example, the pairable device may also have an LED coupled to a processor that may also emit light. The LED of the electronic device 201 and the LED of the pairable device may flash in a pattern that provides a clear suggestion to an observer that the two devices are pairable. In one example, the pattern of the emission of the electronic device 201 and of corresponding indication presented by the pairable device may be synchronized (e.g., the LED of the electronic device 201 and the LED of the pairable device may flash at the same time and at the same frequency or at a substantially similar time and frequency). In another example, the LED of the electronic device 201 and the LED of the pairable device may flash at alternating times and at the same frequency or at a substantially alternating times and a substantially similar frequency in a way that makes it clear to an observer that the two devices are pairable. While some examples of flashing LED patterns are provided, any suitable pattern of LED light emission may be used according to the design criteria of a particular application so that it is clearly suggested to an observer that the two devices are pairable, or have communicated in some way.

In another example, the pairable device may have a display coupled to a processor. Instead of using an LED to provide the indication of pairability, pixels of the display of the pairable device (e.g., either all the pixels of the pairable device or a subset thereof) may be configured to provide the indication of pairability. For example, if the pairable device is a television and the display of the television is on when the electronic device 201 executes the method 400, a subset of the pixels of the display of the pairable device may be configured to flash in a manner similar to that described above in connection with an LED of the pairable device.

In another example, the pairable device and/or the electronic device 201 may emit sound to provide an indication of pairability. For example, the electronic device 201 may use the speaker 256 and the pairable device may have a speaker coupled to a processor for emitting sounds. The electronic device 201 and the pairable device may emit any sound that may suggest to an observer that the two devices are pairable. In one example, the sounds may be presented in a pattern, such that sounds are emitted in a manner similar to that described above in connection with an LED of the pairable device and an LED of the electronic device 201. For example, the emitted sound may sound like a drum beat that is presented in a pattern similar to how the LEDs of the two devices might flash, as described above. While some examples of sounds are provided, any suitable pattern of sound may be used according to the design criteria of a particular application so that it is suggested to an observer (e.g., a listener) that the two devices are pairable.

In another example, the pairable device and/or the electronic device 201 may have a vibrator to provide an indication of pairability. For example, the electronic device 201 may have the transducer 304 that may include an electrical or electromechanical vibrator and the pairable device may have a similar vibrator coupled to a processor for generating vibrations. The electronic device 201 and the pairable device may vibrate in a way that would suggest to an observer that the two devices are pairable. In one example, the vibrations may be presented in a pattern, such that vibrations are emitted in a manner similar to that described above in connection with an LED of the pairable device and an LED of the electronic device 201. For example, the emitted vibration may sound or feel like a drum beat that is presented in a pattern similar to how the LEDs of the two devices might flash, as described above. While some examples of vibrations are provided, any suitable pattern of vibration may be used according to the design criteria of a particular application so that it is suggested to an observer that the two devices are pairable.

While similar groupings of visual indications, audible indications, and vibratory indications are presented as examples of indications of pairability that may be provided by the electronic device 201 and the pairable device, these indications may be interchangeable. For example, the electronic device 201 may provide a vibratory indication in pattern with an audible indication provided by the pairable device. In another example, the electronic device 201 may provide an LED indication in pattern with an audible indication provided by the pairable device. While some examples of indications of pairability are provided, any suitable pattern of indications using any suitable method of providing the indications may be used according to the design criteria of a particular application so that it is suggested to an observer that the two devices are pairable.

Figure 5:
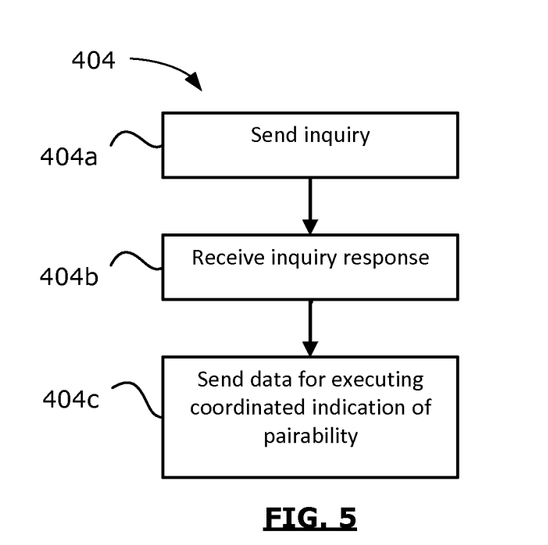
FIG. 5 is a flow chart illustrating a further example of the method of indicating pairing availability as executed on the electronic device FIG. 1.

Referring next to FIG. 5, a flow chart illustrating a further example of a method of indicating pairing availability as executed on the electronic device 201 is shown. Specifically, FIG. 5 illustrates an alternative approach to the block 404 of FIG. 4. In the example provided above, the electronic device may provide the data for executing a coordinated indication of pairability including: (a) the type of coordinated indication requested; and (b) clock synchronization information at the block 404 as part of the discovery inquiry and there may only be one exchange of information between the electronic device 201 and the pairable device (e.g., the blocks 404->602->604->406) before the indication of pairability is performed at the blocks 408 and 610. However, in an alternative example, there may be more than one exchange of information between the electronic device 201 and the pairable device before the indication of pairability is performed at the blocks 408 and 610.

At a block 404a, a pairing inquiry may be sent to pairable devices in the vicinity of the electronic device 201. The pairing inquiry sent at the block 404a may be a conventional or substantially conventional pairing or connection request inquiry sent by a Bluetooth®, NFC, or WiFi system (e.g., the short range communication system 262). In another example, communications may be based on Radio Frequency ID (RFID), Infrared light based communication, or electric field (e-field) sensor based communication. The pairing inquiry may be received by pairable devices in the vicinity of the wireless device 201 at the block 602 (FIG. 6). Pairable devices in the vicinity that are configured to accept a pairing or connection may respond with an affirmative response at the block 604, which is received by the electronic device 201 at the block 404b.

At a block 404c, when affirmative pairing inquiry responses are received by the wireless device 201 at the block 404b, the wireless device 201 may respond with one or more further messages that include the data for executing the coordinated indication of pairability. As mentioned above, the data may include: (a) the type of coordinated indication requested; and (b) clock synchronization information. The further messages may be received by the pairable device at the optional block 606 where the data for executing the coordinated indication of pairability is received by the pairable device.

At an optional block 608, the pairable device may send a further response to the electronic device 201 indicating confirmation of receipt of the further message and either an affirmative or negative response as to whether the type of coordinated indication requested may be executed, as well as any additional suitable information. The further response may be received at the electronic device 201 at the block 406.

Thereafter, the coordinated indication of pairability may be executed by the wireless device 201 at the block 408 and by the pairable device at the block 610 as previously discussed.

In the alternative approach shown in FIG. 5, there are two exchanges of information shown by the first exchange 404a->602->604->404b and then by the second exchange 404c->606->608->406. In one example, the first exchange and the second exchange need not use the same communications standards or protocols. While in some examples the communication protocol used might be of a fairly high bandwidth such as by Bluetooth®, there are other ways which the electronic device 201 may become aware that there is a pairable device in the vicinity. In some examples, the first exchange may be achieved using a relatively low bandwidth connection since the first exchange only needs to convey information about how to initiate a higher bandwidth connection for the second exchange.

In one example, the electronic device 201 may be initially aware of pairable devices using a camera such as the cameras 253 or 254, such as by scanning Quick Response (QR) codes or recognizing the actual pairable device through computer vision or through positioning technology (e.g., geofencing via GPS), in another example, invisible rapid changes in indoor lighting such white LED lamps may be used to convey data to devices equipped with high framerate cameras.

In other words, the first exchange of information (shown by blocks 404a->602->604->404b) may be achieved using any suitable method of communication that allows the electronic device 201 to recognize pairable devices in the vicinity so that a higher bandwidth connection can be established for the second exchange of information (shown by blocks 404c->606->608->406).

Once the method 400 has been completed on the electronic device 201, the electronic device 201 may proceed to perform a pairing process with the pairable device. The pairing process may be initiated, for example by a user of the electronic device 201 providing input to the electronic device 201. Once the pairing process has been completed, the electronic device 201 and the pairable device may perform a second coordinated indication of a successful connection between the electronic device 201 and the pairable device. The second coordinated indication may be executed in a manner substantially similar to the indication of pairability, described in detail above, except that the indication may change from that provided for the indication of pairability. For example, if LEDs were used on both the electronic device 201 and the pairable device to provide the indication of pairability and, for example, the LEDs flashed in a synchronized manner every second to indicate pairability, something about the pattern (e.g., the frequency of the flash) may change after a successful pairing to indicate a connection. In one example, the LEDs might flash every two seconds after a successful pairing has been completed. While an example of a second coordinated indication has been provided, any suitable second coordinated indication may be used according to the design criteria of a particular application.

In yet a further example, a control unit may be used to avoid signal dashes in an environment where many devices are calling for other devices at the same time. For example, a control unit having some or all of the components of the electronic device 201 shown in FIG. 3 may communicate with the electronic device 201 and/or pairabie devices to make sure that no more than two devices use the same pattern at any given time. For example, in a parking lot, cars 1, 2 and 3 might be called upon simultaneously by different devices, such as three electronic devices 201 owned by different users all strolling through a parking lot looking for their cares at the same time, in such a scenario, the control unit may communicate with the electronic devices 201 and/or the pairable devices and instruct the devices to use different patterns for the three cars (e.g., pairable devices) and their corresponding electronic devices 201. These patterns may be designed in such a way that the patterns don't dash or interfere with different rhythms that are easy to distinguish from the others.

While the present application is primarily described in terms of methods, a person of ordinary skill in the art will understand that the present application is also directed to various apparatus' such as an electronic device including a mobile communications device or camera. The electronic device includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a non-transitory compute readable storage medium may include computer executable instructions tangibly embodying code for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is the following:

1. An electronic device comprising:
    a processor;
    a display coupled to the processor;
    a memory coupled to the processor;
    a short-range communication system coupled to the processor;
    a transducer coupled to the processor; and
    a communication module saved in the memory, the communication module for configuring the processor to:
        before performing a pairing process:
            execute a communication discovery process, the communication discovery process including sending information via the short range communication system to a pairable device, the information including data for executing a coordinated indication of pairability in response to the determination that the pairable device is capable of pairing and the pairable device is capable of presenting a coordinated indication of pairability, wherein the data includes one or more of a type of coordinated indication requested by the electronic device and timing information for synchronizing the performance of the coordinated indication between the electronic device and the pairable device;
            receive an affirmative response via the short-range communication system from the pairable device in response to the determination that the pairable device is capable of pairing and the pairable device is capable of presenting a coordinated indication of pairability; and
        cause the coordinated indication of pairability to be performed on the electronic device via one or both of the display and the transducer on the electronic device in response to the affirmative response from the pairable device and in accordance with the one or more of the type of coordinated indication requested by the electronic device and the timing information included in the data for executing the coordinated indication of pairability provided in the communication discovery process, the coordinated indication being performed by the electronic device in synchrony with performance of the coordinated indication on the pairable device.

2. The electronic device according to claim 1, wherein performing the coordinated indication includes emitting an electromagnetic signal using the transducer, the transducer being an electromagnetic transducer, the emission having a pattern that corresponds to an indication presented by the pairable device based on the data.

3. The electronic device according to claim 2, wherein the electromagnetic transducer includes a light emitting diode (LED) and the emission includes emitting light using the LED.

4. The electronic device according to claim 3, wherein the pattern of the emission of the electronic device and of corresponding indication presented by the pairable device are synchronized.

5. The electronic device according to claim 1, wherein the transducer is one of a speaker and a vibrator and performing the coordinated indication on the electronic device includes one of emitting a sound with the speaker and producing a vibratory alert with the vibrator.

6. The electronic device according to claim 1, wherein the short-range communication system is selected from the group consisting of a Bluetooth system, a Near Field Communication (NFC) system, a WiFi communication system, a Radio Frequency ID (RFID) system, an infrared light based communication system, and an electric field (e-field) sensor based communication system.

7. The electronic device according to claim 1, wherein communication discovery process further comprises, before sending the information including data for executing a coordinated indication of pairability:
sending an inquiry via the short-range communication system to the pairable device in the vicinity of the electronic device; and
receiving an inquiry response from the pairable device.

8. The electronic device according to claim 1, wherein the communication module further configures the processor to:
perform the pairing process with the pairable device; and
cause a second coordinated indication to be performed on the electronic device in response to a successful connection between the electronic device and the pairable device.

9. A method on an electronic device of providing a coordinated indication of pairability between the electronic device and a pairable device, the electronic device having a processor coupled to a display, a memory, a short-range communication system, and a transducer, the method comprising:
before performing a pairing process:
executing a communication discovery process, the communication discovery process including sending information via the short range communication system to the pairable device, the information including data for executing a coordinated indication of pairability in response to the determination that the pairable device is capable of pairing and the pairable device is capable of presenting a coordinated indication of pairability, wherein the data includes one or more of a type of coordinated indication requested by the electronic device and timing information for synchronizing the performance of the coordinated indication between the electronic device and the pairable device;
receiving an affirmative response via the short-range communication system from the pairable device in response to the determination that the pairable device is capable of pairing and the pairable device is capable of presenting a coordinated indication of pairability; and
causing the coordinated indication of pairability to be performed on the electronic device via one or both of the display and the transducer on the electronic device in response to the affirmative response from the pairable device and in accordance with the one or more of the type of coordinated indication requested by the electronic device and the timing information included in the data for executing the coordinated indication of pairability provided in the communication discovery process, the coordinated indication being performed by the electronic device in synchrony with performance of the coordinated indication on the pairable device.

10. The method according to claim 9, wherein performing the coordinated indication includes emitting an electromagnetic signal using the transducer, the transducer being an electromagnetic transducer, the emission having a pattern that corresponds to an indication presented by the pairable device based on the data.

11. The method according to claim 10, wherein the electromagnetic transducer includes a light emitting diode (LED) and the emission includes emitting light using the LED.

12. The method according to claim 11, wherein the pattern of the emission of the electronic device and of the corresponding indication presented by the pairable device are synchronized.

13. The method according to claim 9, wherein the transducer is one of a speaker and a vibrator and performing the coordinated indication includes one of emitting a sound with the speaker and producing a vibratory alert with the vibrator.

14. The method according to claim 9, wherein the short-range communication system is selected from the group consisting of a Bluetooth system, a Near Field Communication (NFC) system, a WiFi communication system, a Radio Frequency ID (RFID) system, an infrared light based communication system, and an electric field (e-field) sensor based communication system.

15. The method according to claim 9, wherein communication discovery process further comprises, before sending the information including data for executing a coordinated indication of pairability:
sending an inquiry via the short-range communication system to the pairable device in the vicinity of the electronic device; and
receiving an inquiry response from the pairable device.

16. The method according to claim 9, further comprising:
performing the pairing process with the pairable device; and
causing a second coordinated indication to be performed on the electronic device in response to a successful connection between the electronic device and the pairable device.

17. A non-transitory machine readable medium storing program instructions that when executed by a processor, cause the processor to perform a method for providing a coordinated indication of pairability between an electronic device and a pairable device, the method comprising:
before performing a pairing process:
executing a communication discovery process, the communication discovery process including sending information via a short range communication system to the pairable device, the information including data for executing a coordinated indication of pairability in response to the determination that the pairable device is capable of pairing and the pairable device is capable of presenting a coordinated indication of pairability, wherein the data includes one or more of a type of coordinated indication requested by the electronic device and timing information for synchronizing the performance of the coordinated indication between the electronic device and the pairable device;
receiving an affirmative response via the short-range communication system from the pairable device in response to the determination that the pairable device is capable of pairing and the pairable device is capable of presenting a coordinated indication of pairability; and causing the coordinated indication of pairability to be performed on the electronic device via one or both of the display and the transducer on the electronic device in response to the affirmative response from the pairable device and in accordance with the one or more of the type of coordinated indication requested by the electronic device and the timing information included in the data for executing the coordinated indication of pairability provided in the communication discovery process, the coordinated indication being performed by the electronic device in synchrony with performance of the coordinated indication on the pairable device.

18. The electronic device according to claim 1, wherein the timing information includes clock synchronization information for synchronizing a clock of the electronic device with a clock of the pairable device.

19. The method according to claim 9, wherein the timing information includes clock synchronization information for synchronizing a clock of the electronic device with a clock of the pairable device.

20. The non-transitory machine-readable medium according to claim 17, wherein the timing information includes clock synchronization information for synchronizing a clock of the electronic device with a clock of the pairable device.

* * * * *